United States Patent
Brabson et al.

[11] Patent Number: 5,943,317
[45] Date of Patent: Aug. 24, 1999

[54] SUB-NETWORK ROUTE OPTIMIZATION OVER A SHARED ACCESS TRANSPORT FACILITY

[75] Inventors: Roy F. Brabson, Raleight; John L. Klonowski, Hillsborough, both of N.C.

[73] Assignee: International Business Machines Corp., Armonk, N.Y.

[21] Appl. No.: 09/173,029

[22] Filed: Oct. 15, 1998

[51] Int. Cl.[6] .................................................. H04L 12/56
[52] U.S. Cl. .......................... 370/238; 370/400; 370/254
[58] Field of Search .................................. 370/254, 255, 370/256, 351, 389, 400, 401, 402, 238, 397

[56] References Cited

U.S. PATENT DOCUMENTS

| | | | |
|---|---|---|---|
| 4,987,536 | 5/1988 | Humblet | 364/200 |
| 5,455,865 | 12/1993 | Perlman | 370/389 |
| 5,596,719 | 8/1995 | Ramakrishnan et al. | 370/238 |
| 5,699,347 | 7/1996 | Callon | 370/238 |
| 5,793,765 | 8/1998 | Boer et al. | 370/401 |

*Primary Examiner*—Chau Nguyen
*Assistant Examiner*—Phuongchau Ba Nguyen
*Attorney, Agent, or Firm*—Jerry W. Herndon

[57] ABSTRACT

Multiple virtual routing networks having the same identifier are defined on a shared access transport facility network. Virtual connections are defined from some or all of the network nodes to at least one of the virtual routing networks. A virtual connection contains a medium address for the node to which it is connected. When a route is calculated between a source node and a destination node, the identical identifier representing different virtual routing networks may appear in the calculated route. If it does, all portions of the route after the first occurrence up to and including the last occurrence of the identifier in the calculated route is deleted to achieve the optimal route. A destination node address is obtained from storage that is associated with the virtual connection to the destination node and information can then be directly routed to the destination node address via the calculated route in an efficient manner.

5 Claims, 3 Drawing Sheets

Fig. 3 - Prior Art
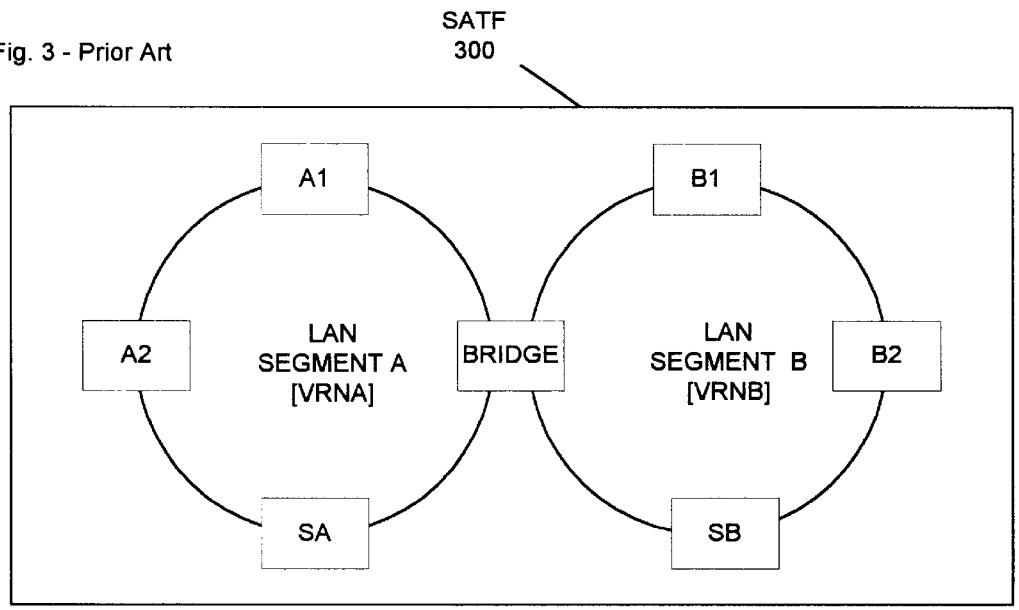
Fig. 4
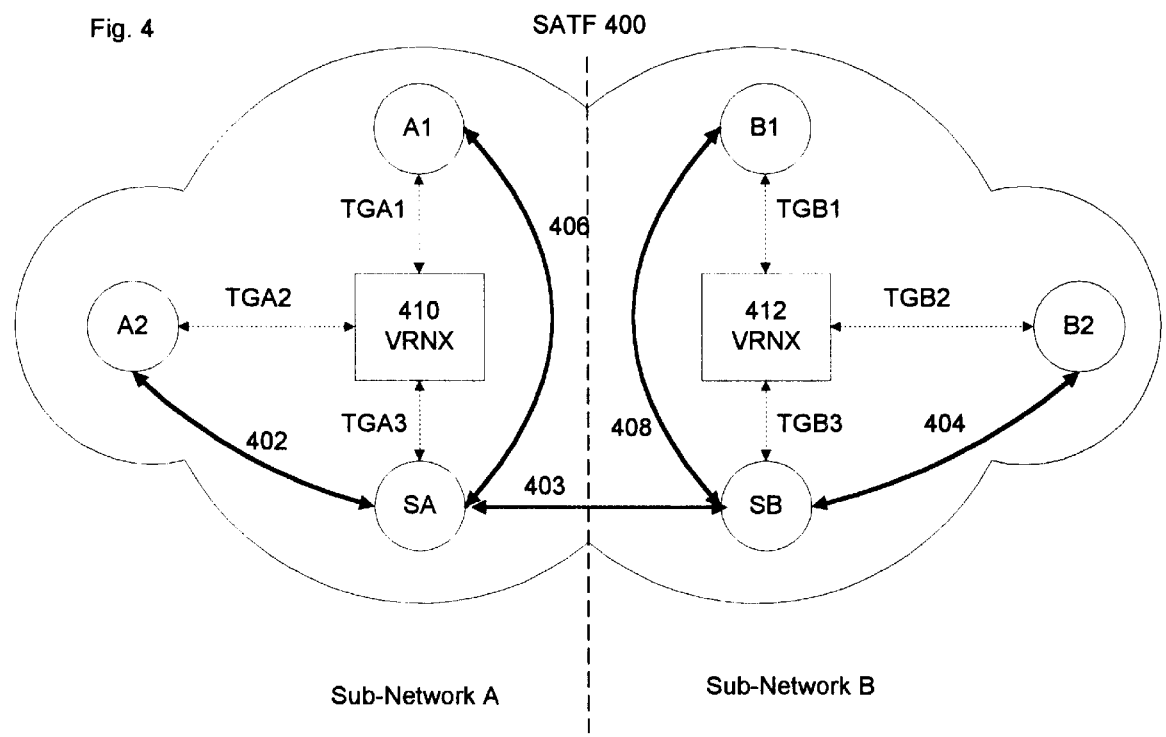

SUB-NETWORK ROUTE OPTIMIZATION OVER A SHARED ACCESS TRANSPORT FACILITY

TECHNICAL FIELD

The invention relates in general to the field of network routing using connection-oriented protocols. In particular, the invention relates to optimizing routing calculations in shared access transport facilities that use virtual routing networks representing sub-networks to minimize the number of link definitions that may otherwise be required if virtual routing networks are not used.

BACKGROUND OF THE INVENTION

A shared access transport facility (SATF) is a communications medium that can be shared among users simultaneously. A good example of an SATF is the telephone network, since many callers can use the facility to place calls at the same time. Another good example is a local area network (LAN), such as a token ring or an Ethernet LAN. Additionally, networks such as X.25, frame relay and asynchronous transfer mode (ATM) networks are all SATF's. One critical piece of information that must be supplied in any SATF environment to establish communications is the address of the destination. When someone picks up the telephone, they must supply a destination telephone number. In a data network, the user must supply a destination address whose format depends on the medium used. In the LAN environment, for example, a data link control layer address is required, often referred to as a Medium Access Control, or MAC, address or a DLC address.

While a number of protocols exist that provide optimal routing within a SATF in which the topology and node addresses are completely known by the node performing the route calculation, route calculation between a source node in one sub-network and a destination node in another sub-network is often not optimal. To understand why, it is necessary to understand some of the terminology and issues involved in these environments.

A sub-network for purposes of this description is defined as a group of nodes that share routing and topology information. For example, the Internet TCP/IP protocols use Routing Information Protocol (RIP) and the Open Shortest Path First (OSPF) protocol to share this information between nodes. IBM's APPN networking architecture uses Topology Routing Services to share this information. By definition, a sub-network shares routing and topology information among the nodes of the sub-network, but this information is not shared with nodes outside of the sub-network. In other words, a border node in one sub-network may be aware of a link address to a border node in an adjacent sub-network, but will have no further information about the topology of the adjacent sub-network. To set up addressing information from a source node in a first sub-network defined on a SATF to a destination node in another sub-network on the SATF, a route calculation server may be used to calculate a route in the first sub-network between the source node to a border node of the second sub-network. A route-calculating server in the second sub-network can be used to calculate a route between the border node and the destination node. The two routes can then be combined to form the complete route between the source and destination nodes. APPN, for example, operates this way. However, the overall route may not be the shortest or most efficient route between the source and destination nodes. Given this, one may question why implement sub-networks at all. First, as networks get large, the amount of processing required to share the topology and routing information gets large as well. In addition, the amount of storage required to store the information can become prohibitive. Network owners may have security concerns, performance concerns and network management concerns that are resolved by limiting routing and topology information sharing to relatively small sub-networks.

For the moment, IBM's APPN architecture will be used as an example for discussion. An APPN network consists of Network Nodes (NN) and End Nodes (EN) connected in a peer-to-peer relationship. EN's are typically user workstations. NN's provide services, such as route calculation, for EN's. Control Point sessions are established between EN's and NN's for control communications, such as requesting a route calculation or for locating other resources in the network. In the APPN architecture, defining the topology in an SATF so that each node can communicate over the best route with any other node in the SATF represents considerable link definition. This is because each node that is a member of the SATF must have defined in each node all routing information needed to reach any other node over the facility in the most efficient way and the DLC addressing information needed to do so. An example of DLC information is a station address on a token-ring LAN. Because each connection between a pair of nodes on an SATF requires two definitions, one in each node, the number of definitions required is N times (N-1), where N is the number of nodes in the SATF.

A special kind of sub-network, called a virtual routing network (VRN), is used in APPN SATF's to reduce the number of link definitions that are required. An APPN VRN is a representation of a shared access transport facility (SATF) or a portion of a SATF that handles the routing of data among the nodes communicating across the SATF. The VRN allows a reduction in the number of required connection definitions by allowing each node to define a single virtual connection to the VRN. Any node defined as having a connection to a VRN is able to communicate directly with any other node also connected to the same VRN without having to define a connection directly between the two nodes. As a result, the number of definitions required to define meshed connectivity between all nodes on a sub-network defined as a VRN is equal to the number of nodes in the sub-network. Session traffic between two nodes that are defined as being connected to a VRN can be routed directly to one another "through" the VRN without passing through any real node.

To avoid confusion, it is important to understand the distinctions between SATF's, sub-networks and virtual routing networks. A SATF network includes all nodes that communicate over the shared medium of the SATF. A sub-network is a set of nodes in the SATF that share topology and routing information amongst themselves, but not with other nodes in the SATF. A virtual routing network, or VRN, is a fictional entity that is defined to represent a sub-network for the purpose of allowing nodes to define virtual connections to the VRN. A sub-network may or may not be defined as a VRN. If it is defined as a VRN, then the topology and routing information pertaining to the sub-network contains virtual connections from the nodes of the sub-network to the VRN.

To summarize, a VRN representing a SATF or a portion of a SATF allows data to be routed directly between the nodes of the VRN, without necessarily defining real topology connections between the nodes. The VRN does not physically exist, but it allows the nodes to define their logical connections to it in the topology database. Any route calculation between source and destination nodes that are part of the same VRN can determine that the nodes are connected to the same VRN and can thus route data directly to each other using underlying DLC addressing information stored in association with the virtual connections. FIG. 1 illustrates this prior art principle. In FIG. 1, a network consists of an SATF 100, which contains two nodes A and B and a server node S. If it is assumed that FIG. 1 shows an APPN network, then nodes A and B might be end nodes and node S might be a network node that serves the end nodes. It is assumed that all the nodes A, B and S can communicate with each other by means of DLC addressing over a shared access medium. The full shared access medium is not shown in FIG. 1 because it is not particularly relevant to the invention. Rather, FIG. 1 represents a view of the network at a layer higher than the physical layer or the medium access control layer. In FIG. 1, a VRN is defined which represents SATF 100 and is shown by the entity VRN in the center of the network cloud. Nodes A and B are not aware of any connectivity between them. The topology databases of nodes A and S contain an entry for the definition of connection 102 between them. This connection is shown as a bold line in FIG. 1 to illustrate that it is a real defined connection on the shared medium. Connection 102 is the connection over which control point sessions would be established if FIG. 1 represented an APPN network. Similarly, nodes B and S contain a topology database entry for the real defined connection 104 between them. The connections between nodes A, B and S to the VRN are dashed in FIG. 1 to indicate that these are virtual connections to a fictional virtual routing network. When node A initiates or responds to a session initiation request, A tells S that it has a trunk group connection (TG1) to the VRN. Included in the TG1 definition is A's DLC address. Similarly, when node B initiates or responds to a session initiation request, B tells S it has a connection (TG2) to the VRN. Included in TG2 is B's DLC address.

When node A wishes to send information to node B, node A requests node S via the connection 102 to calculate a route to node B. In this example, node S calculates the route

A-TG1-VRN-TG2-B and sends this route to node A. Node A recognizes the VRN in the route as a logical sub-network by a single bit in a node descriptor field in the route which identifies VRN as a virtual routing network. Node A ignores the VRN entry in the calculated route, retrieves B's DLC address from TG2 of the route and sends information directly to this DLC address over the SATF. Note that each node of the VRN need only define one connection to the VRN to reach any other node of the VRN, rather than a definition to every other node.

FIG. 2 illustrates a prior art example similar to FIG. 1, except that in FIG. 2 two sub-networks A and B are defined on the SATF 200; sub-network A is further defined as a virtual routing network VRNA 410 and sub-network B is further defined as a virtual routing network VRNB 412. The example of FIG. 2 illustrates the problem solved by the present invention. VRNA includes nodes A1, A2, and server node SA. VRNB includes nodes B1, B2, and server node SB. All nodes in VRNA define virtual connections, such as TGA1, TGA2 and TGA3, to the virtual routing network VRNA. Likewise, all nodes in VRNB define virtual connections, such as TGB1, TGB2 and TGB3, to the virtual routing network VRNB. In addition, since there are two sub-networks, at least one real connection must be defined between the two sub-networks. This is shown as connection 203 in FIG. 2.

Now assuming that node A2 wishes to communicate with node B2, A2 requests a route calculation from its server SA. SA has no information in its topology database regarding routes in sub-network B. It can find out via a search function that node B2 is in sub-network B by sending a search request to node SB. Node SB is then able to search its topology database and locate node B2. Upon finding node B2, node SB calculates a route from itself to node B2. Node SB knows that node B2 is connected to VRNB and returns a route to node SA of

SB-TGB3-VRNB-TGB2-B2.

Node SA calculates a route from node A2 to node SB. Node SA knows that node A2 is connected to VRNA and thus calculates a route of

A2-TGA2-VRNA-TGA3-SA-203-SB

Node SA then combines the two route calculations to create the complete end-to-end route of

A2-TGA2-VRNA-TGA3-SA-203-SB-TGB3-VRNB-TGB2-B2

When A2 now uses this calculated route to transmit packets to node B2, it recognizes that VRNA in the route is a virtual routing network. Consequently, it skips this part of the route, as well as the logical connection TGA2 leading to it and uses the DLC addressing information contained in TGA3 to route packets directly to node SA over the shared medium. The packets contain the calculated route. SA uses the calculated route in the packets to route them over connection 203 to node SB. Node SB recognizes that VRNB is a virtual routing network representing its sub-network and, as in sub-network A, it skips this part of the calculated route as well as the logical connection TGB3 leading to VRNB. Rather, it obtains addressing information for node B2 from TGB2 and routes the packets directly to node B2 over the shared medium. The result of the above is that packets are inefficiently routed three times on the underlying SATF to get from node A2 to node B2.

The above examples of virtual routing networks allow the routing of packets between nodes of a SATF without the overhead of defining every possible connection within the SATF in the topology databases. And the prior art example of FIG. 2 illustrates how multiple sub-networks can be defined within the SATF to allow network owners flexibility in controlling the topology of their SATF. However, the penalty that is paid for this flexibility is inefficient routing within the SATF. For example, the network of FIG. 2 might be implemented as two token ring LANs A and B tied together with a bridge, as shown in FIG. 3. LAN A represents sub-network VRNA of FIG. 2; LAN B represents sub-network VRNB of FIG. 2. In this example, the calculated route between node A2 and node B2 might be

A2-TGA2-VRNA-TGA3-SA-BRIDGE-SB-TGB3-VRNB-TGB2-B2.

A packet from A2 to B2 would first be routed from node A2 to node SA (using DLC addressing information from TGA3). This is once around the ring of LAN A. From node SA, the packet would be sent to the BRIDGE. This is twice around LAN A. The BRIDGE then sends the packet to SB. This is once around LAN B. Finally, node SB sends the packet to B2 using DLC addressing information from TGB2. This is twice around LAN B. Thus, four trips around LAN segments are required in this example, whereas in a SATF with one or no defined sub-networks, but with many connection definitions, only one trip through LAN A and one trip through LAN B is required for the same communication. The invention addresses this problem of inefficient routing when two or more VRNs are defined on a SATF.

SUMMARY OF THE INVENTION

The invention recognizes that in a SATF having two or more sub-networks represented as VRNs, optimal routing between the sub-networks can be achieved by identifying all VRNs with the same virtual routing network identification. When a route is calculated between different sub-networks, the same VRN identification representing each sub-network appears two or more times in the route. All portions of the route after the first occurrence up to and including the last occurrence of the VRN in the calculated route is deleted to achieve the optimal route. In the preferred embodiment, virtual connections are defined that connect nodes to one of the VRNs. The destination node has such a defined virtual connection to a VRN. Once the calculated route between the source node and the destination node is generated, a destination node address is obtained from storage that is associated with the virtual connection. Information is then directly routed to the destination node address via the calculated route.

BRIEF DESCRIPTION OF THE DRAWING

In the drawing,

FIG. 3 shows one specific ring LAN implementation of FIG. 2 as a further aid to understanding the problem in the art;

FIG. 4 shows an illustrative network similar to that of FIG. 2 that incorporates the invention;

DETAILED DESCRIPTION

Figure 1:
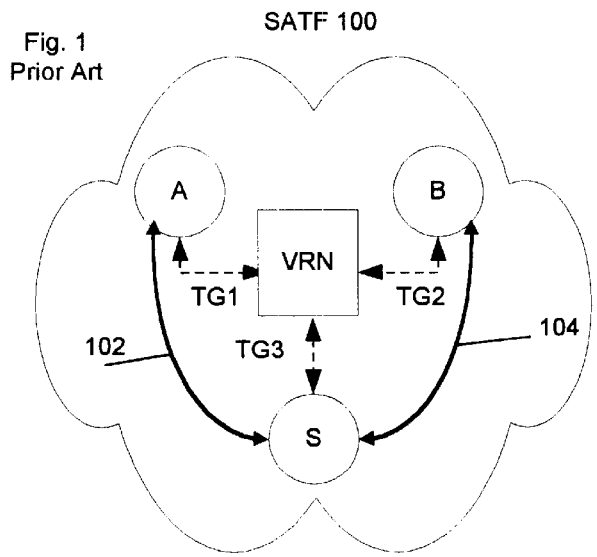
FIG. 1 shows a prior art shared access transport facility (SATF) on which is defined a single VRN sub-network representing the entire SATF.
Figure 2:
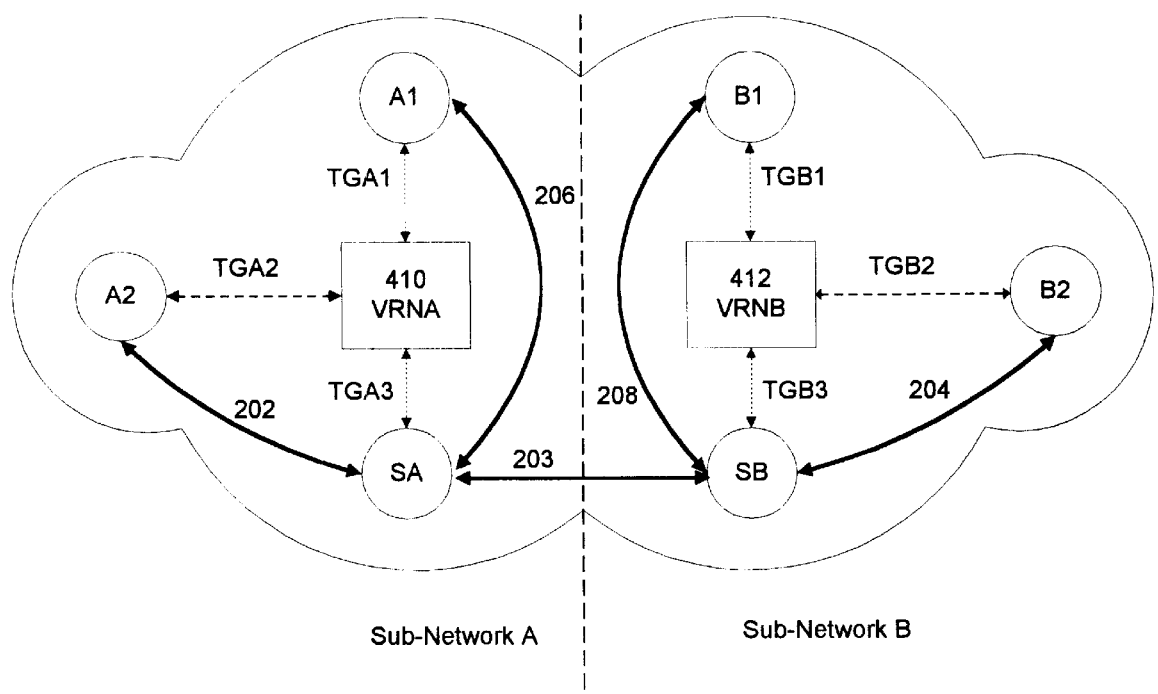
FIG. 2 shows a prior art SATF on which is defined two VRN sub-networks, and is used to illustrate the problem solved by the present invention.

FIGS. 1, 2 and 3 have already been discussed to describe the prior art related to routing of packets in a source routing connection-oriented SATF and the disadvantages that ensue in the art when multiple VRNs are defined on the SATF. FIG. 4 shows an illustrative generalized network including two sub-networks A and B represented, respectively, with VRNs 410 and 412. Sub-networks A and B correspond to sub-networks A and B, respectively, of FIG. 2. In accordance with the invention, however, both of the VRNs 410 and 412 are assigned the same identifier VRNX. Now using the same example that was discussed with respect to FIG. 2, assume that node A2 of FIG. 4 wishes to communicate with node B2 of FIG. 4. Node A2 requests a route calculation from its server SA. SA has no information in its topology data regarding routes in sub-network B. It knows, or finds out by means of a network search protocol, only that node B2 is in sub-network B and that there is a defined connection 403 between node SA and node SB. Node SA requests SB to calculate a route from SB to node B2. Similar to the example of FIG. 2, node SB returns a route of SB-TGB3-VRNX-TGB2-B2 to node SA. SA now calculates a route from A2 to B2 as ti A2-TGA2-VRNX-TGA3-SA-403-SB-TGB3-VRNX-TGB2-B2.

Before using this calculated route to communicate information packets to node B2, A2 first scans the calculated route to locate connections to the same node. When it does this, it determines that node VRNX appears twice in the route. As a result, node A2 deletes from the calculated route all portions after the first appearance of VRNX up to and including the last appearance of VRNX. The new route thus becomes

A2-TGA2-VRNX-TGB2-B2.

Figure 5:
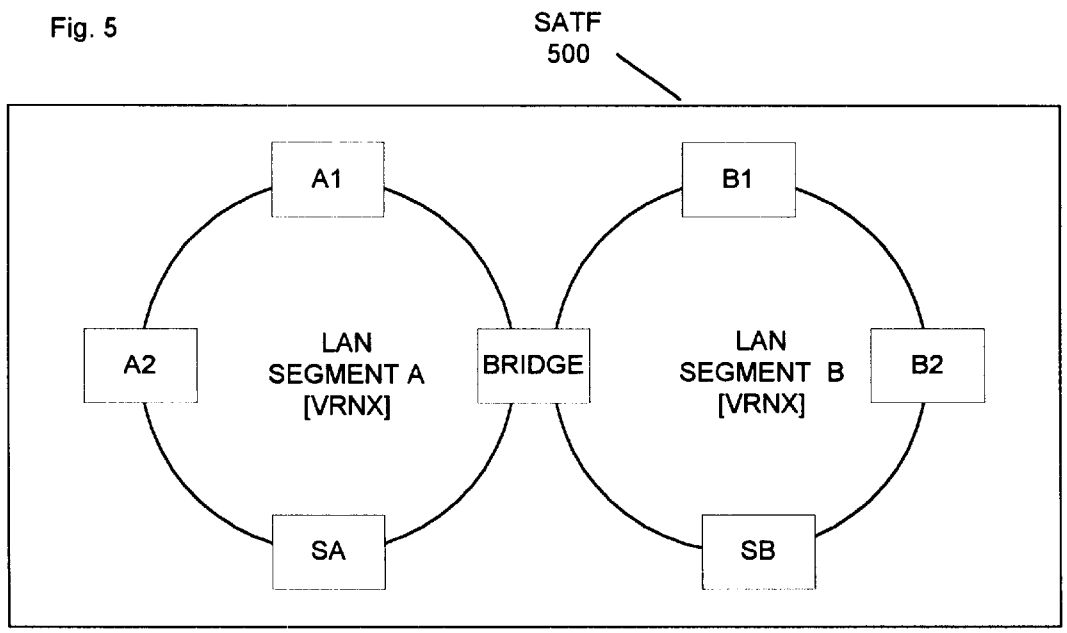
FIG. 5 illustrates the ring LAN of FIG. 3 modified in accordance with the invention.

When A2 now uses this new route to transmit information packets to node B2, it recognizes that VRNX in the route is a virtual routing network. Consequently, it skips this part of the route, as well as the virtual connection TGA2 leading to it and uses the DLC addressing information contained in TGB2 to route packets directly to node B2 via the shared medium. The result of these operations is that packets proceed directly and more efficiently to the destination node than accomplished by the prior art. For example, it is recalled from the ring LAN implementation of FIG. 3 that without the invention, packets are actually routed multiple times around each ring segment of a bridged LAN before reaching the destination. FIG. 5 shows the example of FIG. 3 modified in accordance with the invention to further illustrate how the invention improves the prior art. In FIG. 5, ring LAN segment A is defined as VRNX. LAN segment B is also defined as VRNX. The two segments are connected by a BRIDGE. When node A2 requests a route from itself to node B2, SA receives from LAN segment B the route of

SB-TGB3-VRNX-TGB2-B2

Server SA calculates the route inside of LAN segment A to be

A2-TGA2-VRNX-TGA3-SA-BRIDGE-SB.

Node SA combines the routes into

A2-TGA2-VRNX-TGA3-SA-BRIDGE-SB-TGB3-VRNX-TGB2-B2.

Node A2 now scans the route, locates the redundant appearances of VRNX, and deletes the route information between them. This results in a new route of

A2-TGA2-VRNX-TGB2-B2.

As described above, when node A2 actually routes an information packet to node B2 it recognizes that VRNX in the route is a VRN and ignores it as well as the logical trunk group TGA2 leading to it. Rather, node A2 obtains the DLC routing information of node B2 directly from trunk group TGB2 and sends the packet directly to that address. The packet travels around ring segment A once directly to the BRIDGE. The BRIDGE recognizes from the DLC addressing information in the packet header that it should receive and forward the packet to sub-network B. Hence, the packet travels around ring segment B once and is routed directly to node B2.

Figure 6:
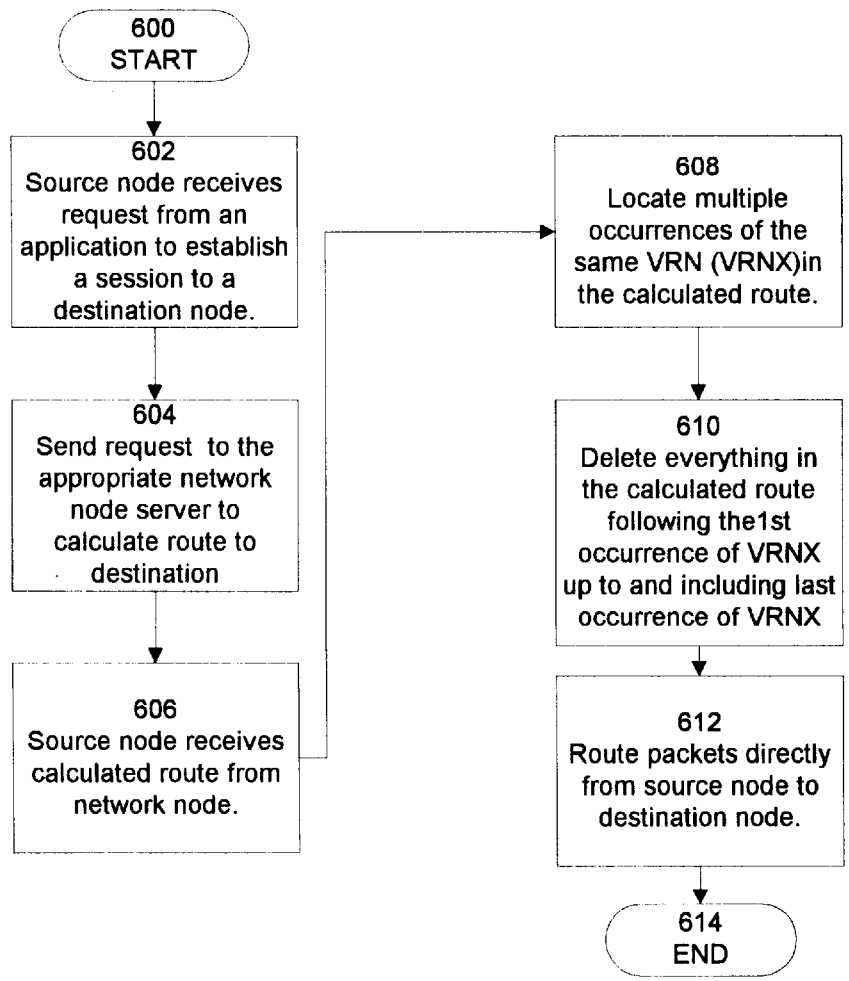
FIG. 6 shows an illustrative flowchart of an algorithm executed at any node of a SATF that includes multiple VRNs, which in accordance with the invention optimizes routing across the SATF.

FIG. 6 illustrates briefly the functional steps performed by the invention in an APPN network to achieve efficient routing when the network consists of an SATF with two or more defined virtual routing networks. At step 602, a source node receives a request from an application program running on the node to establish a communication session with an application program running on a destination node. It is assumed that the source node and the destination node are in different sub-networks represented by VRNs having the same VRN identifier VRNX. At step 604, the source node sends a request to its server node requesting a route calculation to the destination node. The server node requests route calculation from the appropriate server node that serves the destination node. It calculates the route within its own virtual routing network and concatenates this route with the route received from the destination server. At step 606 the source node receives the calculated route from its server. At step 608, the source node parses the received route to locate redundant occurrences of the same node in the calculated route. Thus, the source node recognizes the redundant occurrences of node VRNX and, at step 610, it deletes everything in the calculated route immediately following the first occurrence of VRNX in the route, up to and including the last occurrence of VRNX in the route. As described above, the source node is now able to route packets directly at step 612 to the destination node by recognizing that VRNX in the calculated route is a VRN and obtaining the DLC address of the destination node directly from the virtual connection definition to the destination node. Thus, it is seen that the routing process in SATF networks having two or more virtual routing networks is improved greatly by the simple, but elegant, technique of identifying all of the virtual routing networks within the network with the same identifier.

It is to be understood that the above described arrangements are merely illustrative of the application of principles of the invention and that other arrangements may be devised by workers skilled in the art without departing from the spirit and scope of the invention.

What is claimed:

1. A method of routing data in a shared access transport facility in which two or more sub-networks are defined in the shared access transport facility, wherein a sub-network is defined as a portion of the shared access transport facility that does not share network topology information with any other part of the shared access transport facility, comprising:

defining virtual routing networks in at least first and second of the sub-networks and virtual connections from nodes of the first and second sub-networks to their respective virtual routing networks, wherein a virtual routing network and a virtual connection are fictional entities defined in the topology information and used for calculating routes between nodes of the shared access transport facility, assigning the same identifier X to each of the virtual routing networks, calculating a data route between a source node and a destination node of the shared access transport facility, the route including virtual connections to virtual routing networks X and a virtual connection to the destination node, deleting from the calculated route all entities following the first reference to virtual routing network X up to and including the last reference to the virtual routing network X, obtaining an address of the destination node stored in association with the virtual connection to the destination node, and routing information to the destination address via the calculated route.

2. A shared access transport facility network arranged for routing data between nodes of the network, comprising;

means for defining at least first and second sub-networks, wherein a subnetwork is defined as a portion of the network that does not share network topology information with any other portion of the network, means for defining a first virtual routing network in the first sub-network and means for defining a second virtual routing network in the second sub-network, wherein the first and second virtual routing networks are identified with the same identifier X, means for defining virtual connections from nodes of the first and second sub-networks to their respective first and second virtual routing networks, wherein a virtual routing network and a virtual connection are fictional entities defined in the topology information and used for calculating routes between nodes of the network, means for calculating a data route between a source node and a destination node of the network, the route including virtual connections to virtual routing networks X and a virtual connection to the destination node, means for deleting from the calculated route all entities following the first reference to virtual routing network X up to and including the last reference to the virtual routing network X, and means for obtaining a destination node address stored in association with the virtual connection to the destination node.

3. The network of claim 2 further comprising means for routing information to the destination address via the calculated route.

4. A computer program embodied in a computer readable medium for routing data in a shared access transport facility in which two or more sub-networks are defined in the shared access transport facility, wherein a sub-network is defined as a portion of the shared access transport facility that does not share network topology information with any other part of the shared access transport facility, comprising:

a first code segment for defining virtual routing networks in at least first and second of the sub-networks and virtual connections from nodes of the first and second sub-networks to their respective virtual routing networks, wherein a virtual routing network and a virtual connection are fictional entities defined in the topology information and used for calculating routes between nodes of the shared access transport facility, a second code segment for assigning the same identifier X to each of the virtual routing networks, a third code segment for calculating a data route between a source node and a destination node of the shared access transport facility, the route including virtual connections to virtual routing networks X and a virtual connection to the destination node, a fourth code segment for deleting from the calculated route all entities following the first reference to virtual routing network X up to and including the last reference to the virtual routing network X, a fifth code segment for obtaining an address of the destination node stored in association with the virtual connection to the destination node, and a sixth code segment for routing information to the destination address via the calculated route.

5. A computer data signal embodied in a carrier wave for routing data in a shared access transport facility in which two or more sub-networks are defined in the shared access transport facility, wherein a sub-network is defined as a portion of the shared access transport facility that does not share network topology information with any other part of the shared access transport facility, comprising a first code segment for defining virtual routing networks in at least first and second of the sub-networks and virtual connections from nodes of the first and second sub-networks to their respective virtual routing networks, wherein a virtual routing network and a virtual connection are fictional entities defined in the topology information and used for calculating routes between nodes of the shared access transport facility, a second code segment for assigning the same identifier X to each of the virtual routing networks, a third code segment for calculating a data route between a source node and a destination node of the shared access transport facility, the route including virtual connections to virtual routing networks X and a virtual connection to the destination node, a fourth code segment for deleting from the calculated route all entities following the first reference to virtual routing network X up to and including the last reference to the virtual routing network X, a fifth code segment for obtaining an address of the destination node stored in association with the virtual connection to the destination node, and a sixth code segment for routing information to the destination address via the calculated route.

* * * * *